United States Patent [19]

Müller et al.

[11] Patent Number: 5,573,312
[45] Date of Patent: Nov. 12, 1996

[54] VEHICLE HAVING AN ELECTRIC AND MECHANICAL BRAKING SYSTEM

[75] Inventors: Jacques Müller, Reconvilier; René Jeanneret, Merzligen; Antoine Toth, Delémont, all of Switzerland

[73] Assignee: SMH Management Services AG, Biel, Switzerland

[21] Appl. No.: 245,459

[22] Filed: May 18, 1994

[30] Foreign Application Priority Data

May 18, 1993 [FR] France ................................ 93 06096

[51] Int. Cl.⁶ .................................................. B60T 13/74
[52] U.S. Cl. .............................. 303/3; 303/151; 303/152; 303/189
[58] Field of Search ..................... 303/3, 15, 16, 303/95, 20, 112, 113.1, 113.4, 115.2, DIG. 3, DIG. 4, 151, 152, 189; 188/156; 180/197, 65.3; 318/371, 362

[56] References Cited

U.S. PATENT DOCUMENTS

| | | | |
|---|---|---|---|
| 3,621,929 | 12/1971 | Oberthur | 188/156 |
| 4,962,969 | 10/1990 | Davis | 303/3 |
| 5,061,883 | 10/1991 | Asano et al. | 318/371 |
| 5,294,191 | 3/1994 | Giorgetti et al. | 188/156 |

FOREIGN PATENT DOCUMENTS

| | | |
|---|---|---|
| 0085394 | 8/1983 | European Pat. Off. . |
| 4124496 | 1/1993 | Germany . |
| 4225080 | 2/1993 | Germany . |
| 413609 | 9/1963 | Switzerland . |
| 2219450 | 12/1989 | United Kingdom . |

*Primary Examiner*—Robert J. Oberleitner
*Assistant Examiner*—Peter M. Poon

[57] ABSTRACT

A vehicle (31) has a composite braking system (electric and mechanical). This composite braking system having asynchronous electric motors (4a to 4d) associated with the wheels (2a to 2d) and a mechanical braking device having a hydraulic circuit (14) and mechanical brakes (18a to 18d). The composite braking system also has an electronic measuring device (36) connected to rotation frequency sensors (34a to 34d) disposed on each of the wheels, this electronic device supplying a reference signal to the control circuit (6) of the asynchronous electric motors which regulate the stator frequency of these motors as a function of the value of the reference signal. The braking system of the invention is anti-locking and very effective in any driving situation.

15 Claims, 3 Drawing Sheets

VEHICLE HAVING AN ELECTRIC AND MECHANICAL BRAKING SYSTEM

FIELD OF THE INVENTION

The present invention relates to a vehicle, notably of the electric type, having a composite braking system, i.e. electric and mechanical.

It is known that locking of one or more wheel(s) of a vehicle during braking has a deleterious effect on braking efficiency. If a wheel loses grip, this reduces the braking force of this wheel and renders the vehicle unstable.

Several anti-locking braking devices for motor cars with purely mechanical braking are known to the person skilled in the art.

DESCRIPTION OF THE PRIOR ART

In the case of composite braking (electric and mechanical), DE-A-42 250 80 describes a vehicle of the electric type equipped with four electric motors coupled respectively to the four wheels of this motor car. In addition to these four motors capable of functioning as a generator in a braking mode, a mechanical braking device is provided having four disc brakes coupled respectively to the four wheels of the motor car.

The anti-locking braking device described in the above-cited document only relates to the rear axle in a first embodiment and to the two axles in a second embodiment.

In the first embodiment, a speed sensor is provided on each of the two wheels of the rear axle. A control device regulates an electric valve provided in the hydraulic circuit of the disc brakes of the rear axle by using the two signals supplied respectively by the two speed sensors.

The control device is disposed to react in various ways, as a function of the various parameters of driving of the vehicle, by limiting or by removing the pressure applied to the two disc brakes of the rear axle. In some cases, the control device is adapted so that it decreases the braking couple of the electric motors.

A first disadvantage of the anti-locking braking device described hereinabove resides in the control device, the layout of which is invariably complex and laborious. A second disadvantage derives from the fact that it is very difficult to cover all conceivable driving situations in a control device. The reaction of the anti-locking braking device described hereinabove is therefore very likely to be unsuitable in several driving situations, which makes this anti-locking braking device unreliable. Moreover, the anti-locking braking device reacts with an extended time delay, due to the reaction time of the control device.

OBJECTS OF THE INVENTION

It is an object of the present invention to overcome the disadvantages of the braking device described hereinabove by proposing a vehicle equipped with a composite anti-locking braking system (electric and mechanical) able to react instantaneously and effectively to any driving situation when a braking mode is actuated by a driver of the vehicle.

BRIEF SUMMARY OF THE INVENTION

The present invention therefore relates to a vehicle having:

a wheel;

an electric motor having a stator and a rotor magnetically coupled to said stator and fixed to said wheel for rotation therewith;

control means disposed to cause said electric motor to operate in an electric braking mode in response to a set point signal;

a mechanical braking device associated with said wheel so that it is capable of exerting a mechanical braking torque on this wheel; and braking means operable by a driver of said vehicle between two extreme positions defining a braking travel of these braking means, these braking means providing, when they are actuated by said driver, said set point signal to said control means, the position of these braking means within said braking travel determining the value of said set point signal and the value of said mechanical braking torque;

this vehicle being characterized in that said electric motor is of the asynchronous type, said stator having a stator winding disposed so as to produce a magnetic field rotating at a stator frequency determined by said control means, said rotor rotating at a rotor frequency in response to said rotating magnetic field, and in that this vehicle also has electric supply means, disposed so that said electric motor can function as a generator or as a motor in said braking mode, and measuring means to produce a reference signal corresponding to a reference frequency substantially proportional to the speed of said vehicle and in that, when the speed of said vehicle lies within a range of given values and that said braking means are actuated within a determined range of said braking travel, said mechanical braking means are activated and said electric motor simultaneously functions in said electric braking mode, said control means responding to said reference signal to determine said stator frequency so that this stator frequency is greater than zero and less than said reference frequency.

BRIEF DESCRIPTION OF THE INVENTION

The characteristics described above result in a high performance anti-locking braking system for said wheel.

Since the asynchronous electric motor supplies a torque varying with the slip, that is as a function of the frequency difference between the stator frequency and the rotor frequency, the torque of the electric braking during a loss of grip of the wheel mounted on the rotor of this electric motor decreases automatically and instantaneously without any intervention by a control device.

When mechanical braking is exerted on the wheel at the same time as the electric braking, the electric motor reacts automatically and instantaneously as soon as the mechanical braking begins to lock the wheel, by initially decreasing the torque of the electric braking. In a subsequent second period, if mechanical braking alone suffices to lock the wheel, the electric motor then passes from a generator function to a motor because the mathematical sign of the slip signal is automatically inverted, given the choice of the reference frequency.

According to a special feature of the invention, the difference between the reference frequency and the stator frequency is less than a predetermined maximum value, it being possible for this predetermined value to vary as a function of the value of the reference frequency. It is therefore possible to optimize the braking system as a function of vehicle speed.

According to other features of the invention, said mechanical braking device has a hydraulic circuit and a mechanical brake exerting said mechanical braking torque, this latter varying as a function of a braking pressure applied by the hydraulic circuit to the mechanical brake and determined by the position of a brake pedal or by the pressure exerted on this brake pedal by a driver of the vehicle. The brake pedal is capable of being actuated on a braking travel between two extreme positions of this brake pedal. A pressure limiter is provided in the hydraulic circuit to limit the mechanical braking torque so that the latter remains less than, or equal to, the maximum torque which the electric motor can supply.

These latter features provide a totally anti-locking braking system. Since the mechanical braking torque is always less than or equal to the maximum torque that can be supplied by the electric motor, this latter is consequently always ready to supply a torque greater than or equal to that of the mechanical brake and consequently to unlock the wheel in any driving situation.

In a special embodiment, the vehicle has at least one first wheel with which said mechanical braking device is associated and a second wheel, as well as a first asynchronous electric motor and a second asynchronous electric motor associated respectively with said first and second wheels. This vehicle is characterized in that said first and second asynchronous electric motors each comprise a stator winding having an identical number of poles and turns, these first and second asynchronous electric motors being connected in parallel to said electric supply means which, in the braking mode, absorb a completely alternating electric current slaved to said set point signal.

As a result of the special features mentioned hereinabove, when the first wheel partially locks under the effect of the braking device, the electric braking decreases on this first wheel and increases on the second wheel. The total electric braking thus remains substantially constant as long as the maximum braking torque of the second asynchronous electric motor has not been reached.

It will be noted here that the measuring means may be composed of various electrical, mechanical or optical devices.

BRIEF DESCRIPTION OF THE DRAWINGS

Other features and advantages of the invention will also be set out in the following detailed description given with reference to the appended drawings that are in no way limiting and in which:

FIG. 1 represents a vehicle 1 equipped with four wheels 2a, 2b, 2c and 2d and with four asynchronous electric motors 4a, 4b, 4c and 4d respectively.

DETAILED DESCRIPTION OF THE INVENTION

Figure 1:
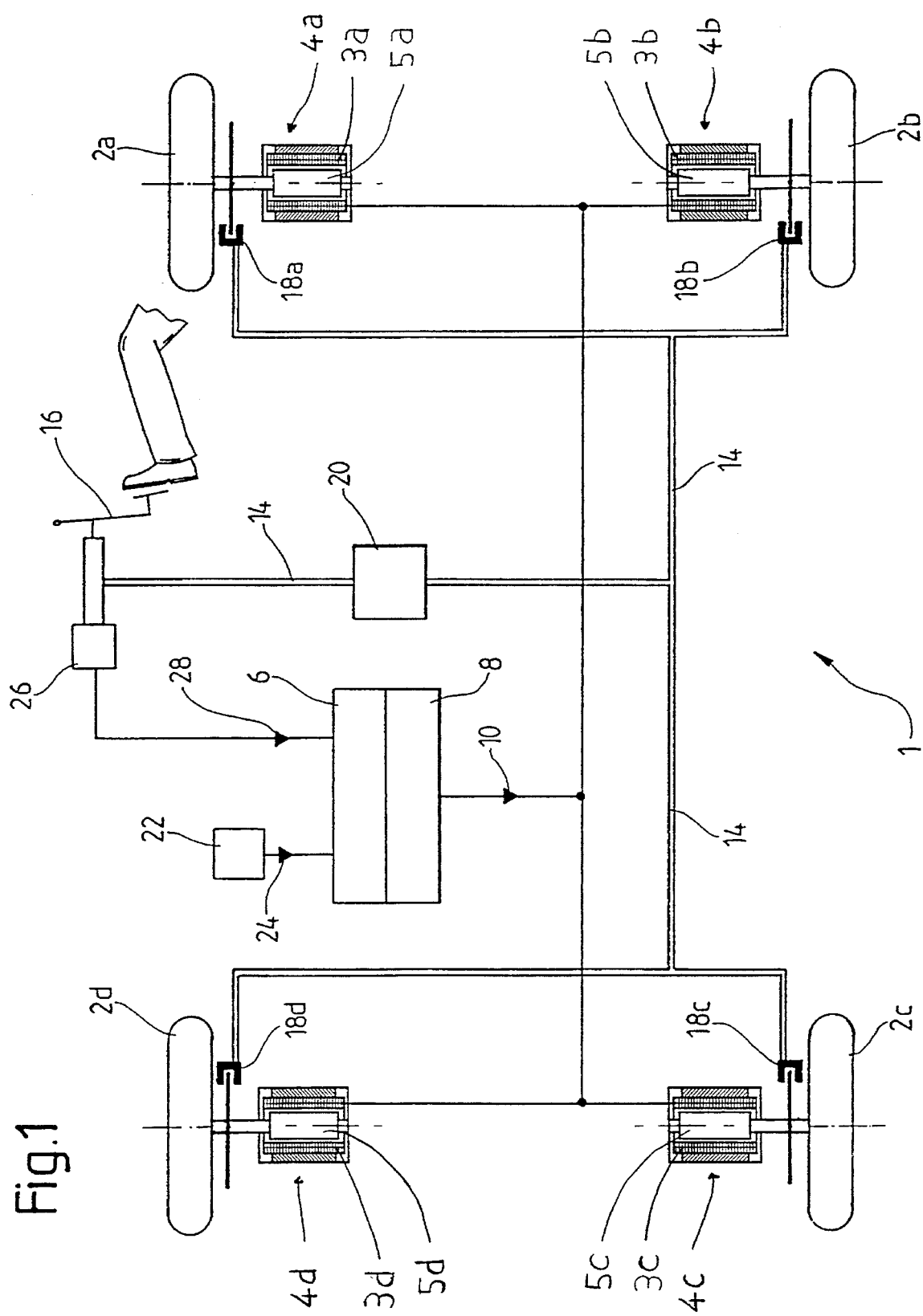
FIG. 1 shows diagrammatically a first general embodiment of a vehicle equipped with a braking system of the invention.

Each of the asynchronous electric motors 4a to 4d has a stator and a rotor 5a to 5d magnetically coupled to said stator and having the respective wheels 2a with which it is associated mounted thereon for rotation therewith. It will be noted that, optionally an attenuating of the rotation frequency can be provided between the rotor of the electric motor and the wheel with which this electric motor is associated. In this case, the rotation frequency of the wheel differs from the rotation frequency of the rotor, hereinafter referred to as rotor frequency. Rotation frequency of a wheel is understood to mean the number of revolutions per unit of time effected by this wheel and measured by an impulse sensor associated with this wheel.

Vehicle 1 is also equipped with control means 6 serving to control the operation of the electric motors 4a to 4d. These control means 6 are associated with electric supply means 8 capable of supplying or absorbing an alternating electric current 10 depending on whether the electric motors 4a to 4d operate globally as a motor or generator.

The vehicle 1 also has a mechanical braking device associated with the wheels 2a to 2d and serving to exert a mechanical braking couple on each of these wheels 2a to 2d. This mechanical braking device has a hydraulic circuit 14 hydraulically connecting the brake pedal 16 to four mechanical brakes 18a, 18b, 18c and 18d associated respectively with the four wheels 2a to 2d. Each of the mechanical brakes 18a to 18d is capable of exerting a mechanical braking couple on the wheel with which it is associated. The value of this mechanical braking couple depends on the value of the pressure prevailing in the hydraulic circuit 14, this pressure being determined by the position of the brake pedal 16 which may be actuated between two extreme positions defining a braking travel.

The mechanical braking device also has a pressure limiter 20 serving to limit the mechanical braking couple exerted on the wheels 2a to 2d of the vehicle 1.

Each of the stators of the asynchronous electric motors 4a to 4d has a stator winding 3a to 3d disposed so as to produce a magnetic field rotating at a stator frequency determined by the control means 6. Each of the rotors of the motors 4a to 4d respectively turns with its own rotor frequency in response to the revolving magnetic field.

It will be noted that the motors 4a to 4d are supplied in parallel by the electric supply means 8 associated with the control means 6. The stator frequency of the rotating magnetic field is thus identical for each of the motors 4a to 4d if each of these motors has a stator winding having the same number of poles and turns. It is this latter case which is proposed in each of the three embodiments of the invention described herein.

The stator frequency of each of the four motors 4a to 4d is thus equal and proportional to the frequency of the alternating electric current 10 supplied, or absorbed by, the electric supply means 8.

The vehicle 1 of the invention also has measuring means 22 serving to determine the driving speed of this vehicle 1 and to supply a reference signal 24 having a value corresponding to a reference frequency substantially equal to the rotation frequency which a wheel of the same diameter as the wheels of the vehicle 1 would have and which would run without skidding at the speed of this vehicle 1. A rotor reference frequency corresponds to this reference frequency and is proportional thereto. The reference signal preferably considers the position of a wheel used to direct the vehicle, given the difference of driving speed of the vehicle wheels in a bend.

Should there be no attenuating between the rotors of the motors 4a to 4d and the corresponding wheels 2a to 2d, the reference frequency defined hereinabove is equal to the rotor reference frequency.

It will be noted that, should an attenuating be provided between each motor 4a to 4d and the respective wheel associated with this motor, the four attenuators would thereby have the same reduction coefficient. The reduction coefficient between the reference frequency defined hereinabove and the rotor reference frequency is exactly determined and identical for each of the motors 4a to 4d.

The reduction coefficient may therefore easily be integrated in the measuring device 22 so that the reference signal has a value corresponding to the rotor reference frequency or be integrated into the control means 6 which then themselves calculate the rotor reference frequency by simply multiplying the reference signal 24 by this reduction coefficient. It will be noted from the foregoing that the term "reference frequency" corresponds to the rotor reference frequency.

Finally, the vehicle 1 also has a set point unit 26 serving to detect at least one parameter in connection with the position of the brake pedal 16 and to supply a set point signal 28 to the control means 6.

The control means 6 are so organized as to regulate the total electric braking torque exerted by the motors 4a to 4d, when the brake pedal 16 is actuated, as a function of the value of the set point signal 28. The control means 6 regulate the stator frequency of the motors 4a to 4d so that, when an electric braking mode is actuated by the brake pedal 16, the frequency difference between the reference frequency and the stator frequency of each of the motors 4a to 4d is positive. In one embodiment, the above-mentioned frequency difference is less than a predetermined value. It will be noted that this predetermined value can vary as a function of the value of the reference signal 24.

The braking system of the invention described hereinabove is anti-locking and particularly effective to respond in an appropriate manner to every conceivable driving situation. When one of the wheels 2a to 2d begins to lock, the asynchronous electric motor associated therewith instantaneously and automatically supplies a lower electric braking torque, given that the slip of this asynchronous electric motor decreases in absolute terms. If the mechanical braking torque exerted on the wheel to the road is too high for the grip conditions of this wheel, the electric braking torque supplied by the electric motor can easily decrease down to zero. If the mechanical braking torque is still too high, the asynchronous electric motor associated with this wheel then passes instantaneously and automatically into a motor function mode by supplying a drive torque opposing the mechanical braking torque.

If the pressure limiter is designed so that the mechanical braking torque exerted by each of the mechanical brakes 18a to 18d remains less than or equal to the torque which each of the asynchronous electric motors 4a to 4d can supply, each motor 4a to 4d can supply a drive torque greater than or equal to the maximum mechanical braking torque which can be exerted by each mechanical brake 18a to 18d. This provides a total anti-locking braking system.

It will be noted that the braking system of the invention is also applied when the asynchronous electric motors 4a to 4d are not all supplied in parallel. In a variant of this first embodiment of the invention, each of the four motors 4a to 4d is controlled and supplied separately. In a second variant of this first embodiment, two of the four asynchronous electric motors are supplied in parallel by the first electric supply means and the two other asynchronous electric motors are also supplied in parallel by the second electric supply means. Each of these first and second electric supply means are controlled by their own control means or jointly by central control means.

It will moreover be noted that the mechanical braking device may be of any type known to the person skilled in the art.

Figure 2:
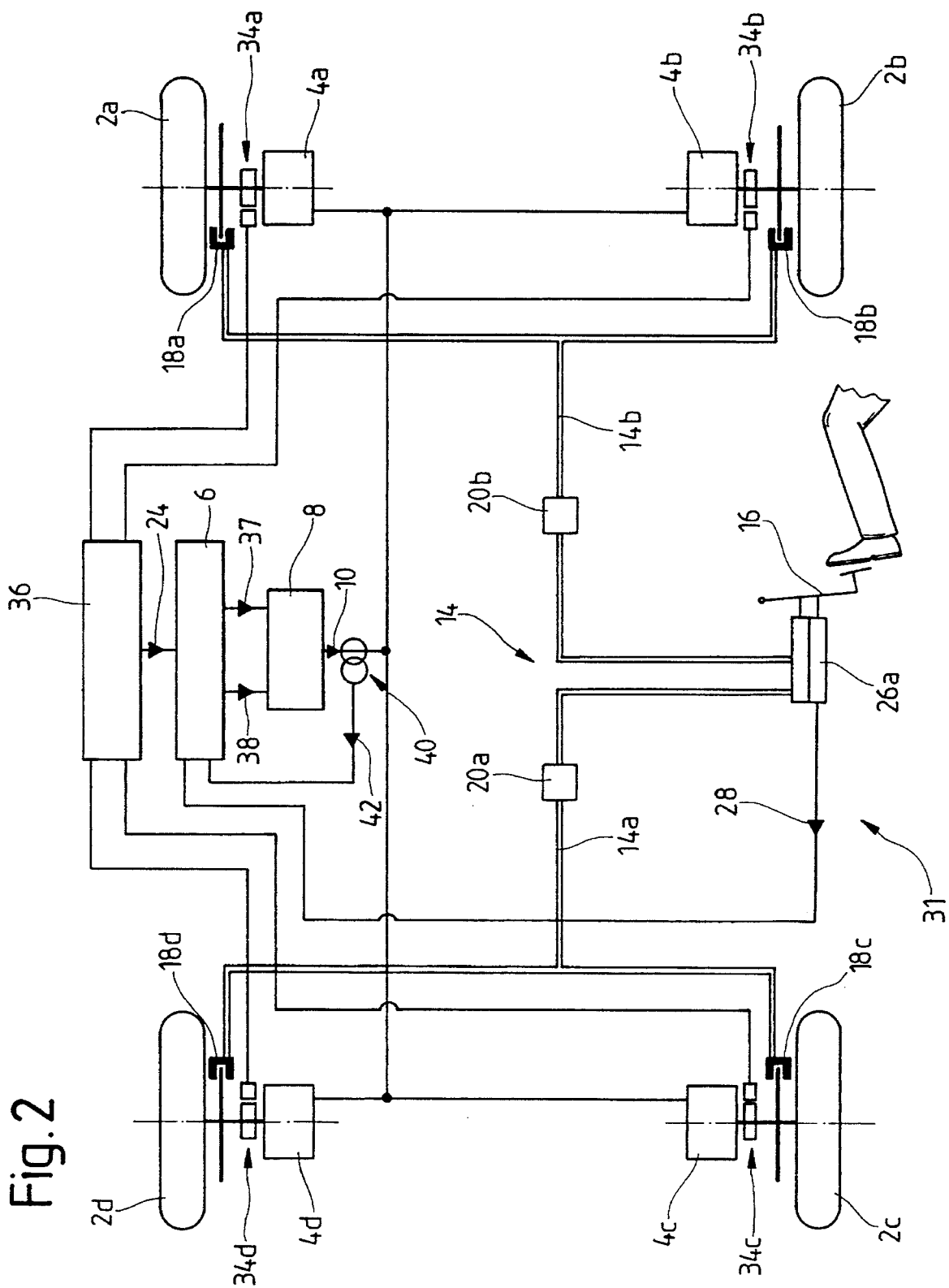
FIG. 2 shows diagrammatically a second embodiment of a vehicle equipped with a braking system of the invention.

Referring to FIG. 2, a second embodiment of a vehicle 31 equipped with a braking system of the invention will be described hereinbelow.

The references already described for the first embodiment of the invention will not be commented on again in detail here.

In this second embodiment, the mechanical braking device has a hydraulic circuit 14 formed by a first secondary hydraulic circuit 14a and by a second secondary hydraulic circuit 14b. These first and second secondary hydraulic circuits 14a and 14b are independent of one another. Nonetheless, the pressure prevailing in each of these secondary hydraulic circuits 14a and 14b is determined jointly with the help of the brake pedal 16.

A pressure limiter 20a and 20b is provided on each of the secondary hydraulic circuits 14a and 14b to limit the pressure capable of prevailing respectively in the first secondary hydraulic circuit 14a and in the second secondary hydraulic circuit 14b.

It will be noted here that it is possible to provide a different maximum pressure for the first secondary hydraulic circuit 14a and for the second secondary hydraulic circuit 14b. It is consequently possible to exert a different mechanical braking torque to the front and to the rear of the vehicle 31. In the latter case, it is also possible to provide asynchronous electric motors capable of supplying a maximum electric torque of different value between the motors 4c and 4d provided at the front of the vehicle 31 and the motors 4a and 4b provided at the rear of this vehicle 31, while still having a totally anti-locking braking system without any overdimensioning of one or other of the motors 4a to 4d.

In FIG. 2, the measuring means serving to measure a reference frequency substantially proportional to the rotation frequency of a wheel having a same diameter as the wheels 2a to 2d of the vehicle 31 and driving without skidding at the speed of this vehicle, are formed by four rotation frequency sensors 34a, 34b, 34c and 34d, associated respectively with the wheels 2a to 2d, or in equivalent manner, to four rotors of the asynchronous electric motors 4a to 4d respectively.

The four frequency rotation sensors 34a to 34d are electrically connected to an electronic measuring device 36 which supplies a reference signal 24 to the control means 6. The electronic measuring device 36 is so arranged that the reference signal 24 which it supplies to the control means 6 has a value corresponding to the maximum rotor frequency of the motors 4a to 4d or, in equivalent manner, at the maximum rotation frequency of the wheels 2a to 2d.

As already stated in connection with the first embodiment of the invention, an identical and predetermined factor connects the rotor frequency of each of the motors 4a to 4d to the rotation frequency of the wheel 2a to 2d, respectively 2b to 2d which is associated therewith. It is therefore functionally equivalent for the reference signal 24 to have a value corresponding to the maximum rotation frequency of the wheels 2a to 2d or to the maximum rotor frequency of the motors 4a to 4d. However, the control means 6, when the braking mode is activated by means of the brake pedal 16, regulates the stator frequency of the motors 4a to 4d so that during breaking this stator frequency is less than the maximum rotor frequency.

It will be noted that the maximum rotor frequency constituting the reference frequency has a value substantially proportional to the speed of the vehicle 31 as long as at least one of the four wheels 2a to 2d rotates without skidding. Should the wheel displaying the best grip skid slightly, the reference frequency supplied by the measuring means to the control means 6 remains a good approximation of the speed of the vehicle 31 expressed as rotation frequency of the rotor of one of the four motors 4a to 4d.

It will be noted that in this second embodiment, the control means 6 will independently regulate the frequency and the voltage amplitude of the alternating electric current 10 supplying the four asynchronous electric motors 4a to 4d with the aid of, respectively, a first control signal 37 and a second control signal 38.

This second embodiment also provides a measuring unit 40 serving to measure the alternating electric current 10. This measuring unit 40 supplies a signal 42 to the control means 6, the value of which is representative of the alternating electric current 10. The value of the signal 42 is slaved to the value of the set point signal 28 supplied by the set point unit 26a to the control means 6. The control means 6 thus organise the regulation of the voltage amplitude and of the frequency of the alternating electric current 10 as a function of the set point signal 28. The set point signal 28 consequently regulates the total electric braking torque, given that this total electric braking torque is defined by the value of this alternating electric current 10. Moreover, as has already been mentioned, the control means 6 organise the regulation of the stator frequency by means of the frequency of the alternating electric current 10 as a function of the reference signal 24.

The organisation of the electric braking together with the mechanical braking is provided in this second embodiment in the following manner: in a first phase the intention is first to use the electric braking and only to use the mechanical braking in a second phase, the electric braking then having substantially attained the maximum electric braking torque of the motors 4a to 4d. To do this, the set point unit 26a is constructed as a sensor of the position of the brake pedal 16. It should be noted that the organisation of the braking of this second embodiment described herein can only relate to a certain range of speeds, that is function in the manner proposed by the present invention in a given range of speeds and in a different mode of operation outside this given range of speeds, notably for low speeds.

The brake pedal 16 has a certain travel, the first part of which does not cause any increase in the pressure in the hydraulic circuit 14. The control means are disposed so that the asynchronous electric motors 4a to 4d substantially supply a maximum electric braking torque when the brake pedal 16 is situated substantially at the end of the first part of the above-mentioned travel. In a second part of the travel that can be covered by the brake pedal 16, the electric braking is controlled so that it supplies a maximum electric braking torque and the mechanical braking torque is progressively increased. To limit the mechanical braking, the pressure limiters 20a to 20b are provided respectively in the first and second secondary hydraulic circuits 14a and 14b.

Should one of the wheels 2a to 2d begin to lock, the electric braking torque exerted on this wheel by the asynchronous electric motors associated therewith is instantaneously and automatically decreased. Given that the signal 42 supplying the value of the alternating electric current 10 to the control means 6 is slaved to the set point signal 28, it follows that a reduction of the electric braking torque on one of the wheels 2a to 2d due to locking, as far as a reserve of the electric braking torque is provided, does not result in a reduction of the total electric braking torque. This latter finding constitutes an interesting advantage of the supply in parallel of the motors 4a to 4d.

It will be noted that the control means 6 are disposed so that the electric supply means 8, controlled by means of control signals 37 and 38, bring about optimal organisation of the motors 4a to 4d as a function of the set point signal 28 and of the reference signal 24. To do this, the control means 6 are disposed to regulate the frequency and the voltage amplitude of the alternating electric current 10 independently.

When a decrease in the alternating electric current, produced by the motor(s) of the wheel(s) beginning to lock, cannot be compensated by the increase in the current supplied by the other motor(s), there is necessarily a decrease in the alternating electric current 10. If the set point signal 28 remains identical, the control means 6 disposed to control the value of the alternating electric current 10 to the value of the set point signal 28 can react either by increasing the voltage amplitude of the alternating electric current 10, or by decreasing the frequency of this alternating current 10, so as to increase the slip of each of the motors 4a to 4d. In the latter case, assuming that the reference signal 24 retains a constant value, the stator frequency is in danger of decreasing greatly by departing from the reference frequency. If this is the case, the organisation of braking moves away from optimal organisation and the efficacy of the braking is in danger of decreasing, which would have a deleterious effect on the road performance of the vehicle.

In the extreme case where three of the four wheels 2a to 2d present bad grip and that emergency braking is activated by a driver of the vehicle 31, it follows from the foregoing that the supply frequency and the stator frequency would tend towards a zero value if the control means 6 are not disposed so that the frequency difference between the reference frequency and the stator frequency would have a value less than a predetermined value. This explains why, in order to prevent such a situation occurring, the control means 6 according to a preferred embodiment of the invention are disposed so that the difference between the reference frequency and the stator frequency, determined by the frequency of the alternating electric current 10, is less than a predetermined value. This predetermined value may vary as a function of the value of the reference signal 24.

The braking signal according to the second embodiment of the invention is thus particularly reliable. Given the speed of reaction of the asynchronous electric motor when a wheel begins to lock to decrease the electric braking torque and unlock this wheel, it is almost impossible for the four wheels 2a to 2d of the vehicle 31 to be simultaneously in a condition of loss of grip. The measuring device supplying the reference signal 24 provided in this second embodiment of the invention consequently very efficiently fulfils the function which it is required to perform in almost any driving situation.

It will be noted that the control means 6 and the electric supply means 8 can also serve to supply the electric motors 4a to 4d in a mode of propulsion in which these motors 4a to 4d function as motors by absorbing an alternating electric current.

Figure 3:
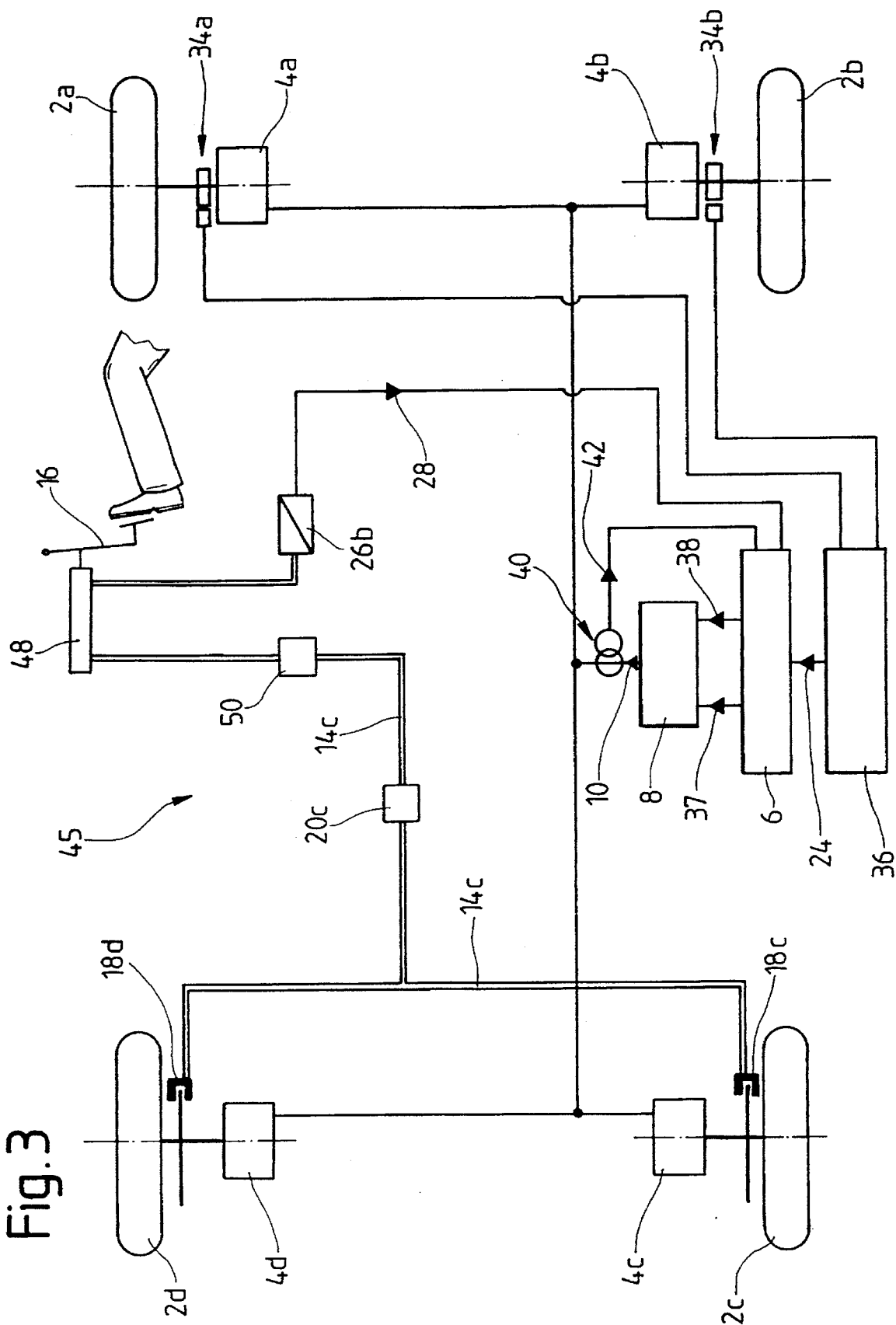
FIG. 3 shows diagrammatically a third embodiment of a vehicle equipped with a braking system of the invention.

A third embodiment of a vehicle 45 equipped with a braking system of the invention will now be described with reference to FIG. 3.

The references already described in the two preceding embodiments will not be commented on again in detail herein.

The vehicle 45 according to this third embodiment differs essentially from the second embodiment in that only the two wheels 2c and 2d located at the front of the vehicle are equipped respectively with a mechanical brake 18c and 18d. These mechanical brakes 18c and 18d are actuated by means that may be actuated by a driver of the vehicle 45, these being connected to the mechanical brakes 18c and 18d by a hydraulic circuit 14c.

Once again, a pressure limiter 20c is provided in the hydraulic circuit 14c. In this third embodiment, the set point unit 26b is formed by a pressure sensor serving to measure the hydraulic pressure prevailing in the cylinder 48 of the hydraulic circuit 14c, this pressure sensor 26b supplying an set point signal 28, the value of which corresponds to the hydraulic pressure prevailing in the cylinder 48, this pressure corresponding to the pressure exerted by the driver of the vehicle 45 on the brake pedal 16.

To keep the mechanical braking couple substantially zero in a first range of values of the pressure exerted by the driver of the vehicle 45 during braking, a discharge valve 50 is provided in the hydraulic circuit. This discharge valve 50 reduces the pressure in the part of the hydraulic circuit 14c located next to the mechanical brakes 18c and 18d relative to this discharge valve 50. It is therefore possible to use only the electric braking in a first range of the values of the pressure exerted by the driver of the vehicle 45. To achieve this, the control means 6 are disposed so that the electric motors 4a to 4d substantially reach a maximum electric braking torque for a maximum value of the first abovementioned range of values.

In a second range of pressure values greater than the pressure values of the first range, the electric braking is supported by the mechanical braking.

It will be noted that it is possible to provide asynchronous electric motors 4c and 4d that are more powerful at the front of the vehicle than the asynchronous electric motors 4a and 4b situated at the rear of this vehicle 45.

The means serving to measure the rotation frequency of a wheel corresponding to the speed of the vehicle or the corresponding rotor frequency are formed in this third embodiment by an electronic measuring device 36 similar to that described in the second embodiment. However, as distinct from the second embodiment, this electronic measuring device 36 is only connected to two sensors of the rotation frequency 34a and 34b, associated respectively with the two wheels 2a and 2b located at the rear of the vehicle.

This third embodiment of the invention has the advantage of avoiding any risk of locking of one of the two wheels 2a and 2d situated at the rear of the vehicle 45, given that only an electric braking by means of asynchronous electric motors 4a and 4b is exerted on these two wheels 2a and 2b. It is therefore prudent to place the rotation frequency sensors 34a and 34b on the two wheels 2a and 2b respectively. It follows from the foregoing that the reference signal 24 supplied to the control means is reliable and fulfils its function in any driving situation.

To make the reference signal 24 even more reliable, a variant of this third embodiment provides for two other rotation frequency sensors to be placed respectively on the two front wheels 2c and 2d in similar manner to the second embodiment described hereinabove.

In another variant of this third embodiment, the asynchronous electric motors 4c and 4d located at the front of the vehicle are supplied and controlled independent of the asynchronous electric motors 4a and 4b located at the rear of the vehicle. It is therefore possible to create in the motors 4c and 4d located at the front of the vehicle an operating organisation different from that of the motors 4a to 4b situated at the rear of this vehicle.

In this last variant of the third embodiment, it is for example possible to dispose control means so that the motors 4a and 4b located at the rear of the vehicle are activated, during braking, in a mode of propulsion when locking of the front wheels 2c and 2d occurs due to mechanical braking exerted on these latter. It is therefore possible to obtain a totally anti-locking braking system with a mechanical braking device on the front wheels 2c and 2d capable of exerting a mechanical braking couple greater than the maximum electric couple capable of being supplied by the two motors 4c and 4d situated at the front of the vehicle, provided that the maximum mechanical braking torque does not exceed the total maximum torque capable of being exerted by the four motors 4a to 4d.

Finally, it will be noted that the assembly formed by the four asynchronous electric motors 4a to 4d, the control means 6, the supply means 8 and the electronic measuring device 36 connected to the rotation frequency sensors 34a and 34d may also be used for the traction of the vehicle 45. This latter remark also applies to the first two embodiments described hereinabove.

We claim:

1. A vehicle having:

a wheel;

an electric motor having a stator and a rotor magnetically coupled to said stator and rotationally fixed to said wheel;

control means disposed to cause said electric motor to operate in an electric braking mode in response to a set point signal;

a mechanical braking device associated with said wheel so that said mechanical braking device is capable of exerting a mechanical braking torque on said wheel; and braking means operable by a driver of said vehicle between two extreme positions defining a braking travel of said braking means, said braking means providing, when they are actuated by said driver, said set point signal to said control means, the position of said braking means within said braking travel determining the value of said set point signal and the value of said mechanical braking torque;

said electric motor being of the asynchronous type, said stator having a stator winding arranged so as to produce a magnetic field rotating at a stator frequency determined by said control means, said rotor rotating at a rotor frequency in response to said rotating magnetic field, the vehicle also having electric supply means arranged so that said electric motor can function as a generator or as a motor in said braking mode, and measuring means to produce a reference signal corresponding to a reference frequency approximately equal to said rotor frequency when said wheel has a speed equal to the speed of said vehicle and wherein, when the speed of said vehicle lies within a range of given values and said braking means are actuated within a determined range of said braking travel, said mechanical braking device is activated and said electric motor simultaneously functions in said electric braking mode, said control means responding to said reference signal to determine said stator frequency so that said stator frequency is greater than zero and less than said reference frequency.

2. A vehicle according to claim 1, wherein said braking means comprise a set point unit which supplies said set point signal to said control means.

3. A vehicle according to claim 2, wherein said mechanical braking device has a hydraulic circuit and a mechanical brake serving to exert said mechanical braking torque, said braking torque varying as a function of a braking pressure applied by said hydraulic circuit to said mechanical brake and determined by the position of a brake pedal pertaining to said means actuatable by a driver of said vehicle, and where a pressure limiter is provided in said hydraulic circuit so as to limit said mechanical braking torque so that this latter remains less than or equal to a maximum torque capable of being supplied by said electric motor.

4. A vehicle according to claim 3, wherein said set point unit is composed by a pressure sensor making it possible to measure the pressure exerted by said driver on said brake pedal, said pressure sensor supplying said set point signal the value of which is a function of said pressure exerted by said driver.

5. A vehicle according to claim 4, wherein said hydraulic circuit includes a discharge valve serving to maintain said mechanical braking torque substantially in a first range of pressure values of said pressure exerted by said driver, said control means being disposed so that said electric motor substantially attains a maximum electric braking torque for a maximum value of said first range.

6. A vehicle according to claim 3, wherein said set point unit is composed by a position sensor of said brake pedal, said position sensor supplying said set point signal the value of which corresponds to said position of said brake pedal.

7. A vehicle according to claim 6, wherein said brake pedal has a certain travel, a first part of which does not cause any increase in pressure in said hydraulic circuit, said control means being disposed so that said electric motor reaches substantially a maximum electric braking torque for a position of said brake pedal substantially at the end of said first part.

8. A vehicle according to claim 1, wherein when said vehicle has a speed in said given range of values said braking means are actuated within said predetermined range of said braking travel, the difference between said reference frequency and said stator frequency is less than a predetermined maximum value, said maximum value varying as a function of said reference frequency.

9. A vehicle according to claim 1, having:
at least one first wheel and a second wheel;
a first asynchronous electric motor and a second asynchronous electric motor associated respectively with said first and second wheels; the vehicle having said first and second asynchronous electric motors each comprising a stator winding having an identical number of poles, said first and second asynchronous electric motors being connected in parallel to said electric supply means.

10. A vehicle according to claim 9 having two front wheels and two rear wheels which also has:
two mechanical brakes associated respectively with the two front wheels and belonging to said mechanical braking device;
four asynchronous electric motors associated respectively with the two front wheels and the two rear wheels, said four asynchronous electric motors being connected in parallel to said electric supply means, said four asynchronous electric motors supplying or absorbing a total alternating electric current the value of which is slaved to the value of said set point signal.

11. A vehicle according to claim 10 which having any two mechanical brakes.

12. A vehicle according to claim 10 wherein said mechanical braking device also has two mechanical brakes associated respectively with the two rear wheels and where this mechanical braking device is so disposed that each of the mechanical brakes associated respectively with the two front wheels and the two rear wheels has a maximum braking torque less than or equal to a maximum torque capable of being supplied by said asynchronous electric motors associated with the front or rear wheel respectively.

13. A vehicle according to claim 10, wherein said measuring means are composed of two rotation frequency sensors associated with the two rear wheels and of an electronic measuring device electrically connected to these two rotation frequency sensors, said electronic measuring device supplying said reference signal and being disposed so that the value of said reference signal corresponds to the maximum rotor frequency of the asynchronous electric motors associated respectively with the two rear wheels.

14. A vehicle according to claim 13, wherein said measuring means only comprise two rotation frequency sensors.

15. A vehicle according to claim 10, wherein said measuring means comprise four rotation frequency sensors associated respectively with the two front wheels and the two rear wheels by an electronic measuring device electrically connected to these four rotation frequency sensors, said electronic measuring device supplying said reference signal and being disposed so that the value of said reference signal corresponds to the maximum rotor frequency of the asynchronous electric motors associated respectively with said two front and two rear wheels.

* * * * *